United States Patent
Rodriguez et al.

(10) Patent No.: US 9,132,777 B1
(45) Date of Patent: Sep. 15, 2015

(54) MOTOR VEHICLE EQUIPPED WITH DYNAMIC FLOOR SECTION

(71) Applicant: FORD GLOBAL TECHNOLOGIES, LLC, Dearborn, MI (US)

(72) Inventors: Ricardo Ignacio Medina Rodriguez, Mexico City (MX); Francisco Javier Villanueva, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/524,294

(22) Filed: Oct. 27, 2014

(51) Int. Cl.
*B60R 99/00* (2009.01)
*B60R 5/04* (2006.01)

(52) U.S. Cl.
CPC .................................... *B60R 5/04* (2013.01)

(58) Field of Classification Search
CPC .............................................. B60R 5/04
See application file for complete search history.

(56) References Cited

U.S. PATENT DOCUMENTS

| | | | |
|---|---|---|---|
| 2,898,146 A * | 8/1959 | Yudenfreund | 296/39.1 |
| 5,544,998 A | 8/1996 | Malinowski | |
| 6,516,983 B2 | 2/2003 | Sotiroff et al. | |
| 7,188,881 B1 | 3/2007 | Sturt et al. | |
| 7,992,912 B2 | 8/2011 | Klotz et al. | |
| 2007/0065264 A1 | 3/2007 | Sturt et al. | |
| 2008/0178428 A1 * | 7/2008 | McDonald | 16/344 |
| 2008/0277957 A1 * | 11/2008 | Hirayama et al. | 296/37.16 |
| 2008/0284214 A1 * | 11/2008 | Neale | 297/15 |
| 2010/0176620 A1 * | 7/2010 | Micheli | 296/63 |
| 2011/0241372 A1 * | 10/2011 | Kusu | 296/24.43 |
| 2012/0261935 A1 * | 10/2012 | Perez | 296/24.4 |

FOREIGN PATENT DOCUMENTS

| | | |
|---|---|---|
| DE | 102004051622 A1 | 4/2006 |
| EP | 1852308 A1 | 11/2007 |
| EP | 2228262 A1 | 9/2010 |
| GB | 2309448 A | 7/1997 |
| WO | 0181117 A1 | 11/2001 |

OTHER PUBLICATIONS

English machine translation of DE102004051622.
English machine translation of EP1852308.
English machine translation of EP2228262.
English machine translation of WO0181117.

* cited by examiner

*Primary Examiner* — Lori L Lyjak
(74) *Attorney, Agent, or Firm* — Chea, Vichit, King & Schickli, PLLC (57) ABSTRACT

A vehicle incorporates a storage area with a dynamic floor section. That dynamic floor section includes a plurality of interconnected panels that slide and fold so as to be displaceable between a home position and a shifted position. Advantageously, the movement of the panels allows better access to objects resting on the dynamic floor section.

15 Claims, 7 Drawing Sheets

MOTOR VEHICLE EQUIPPED WITH DYNAMIC FLOOR SECTION

TECHNICAL FIELD

This document relates generally to the motor vehicle field and, more particularly, to a motor vehicle equipped with a dynamic floor section displaceable between a home position and a shifted position so as to allow better access to objects carried on otherwise hard to reach areas of the floor.

BACKGROUND

This document relates generally to a vehicle incorporating a dynamic floor section which functions to allow better access to a storage area in the vehicle. The dynamic floor section is particularly useful in a vehicle incorporating a rear tailgate or door that is hinged at the side and swings open. When such a vehicle is parked near an obstruction, the rear door or tailgate may only be opened a limited amount. While that opening may allow reasonable access to the storage area adjacent the latch side of the swinging tailgate, it may severely limit access to the storage area adjacent the hinge side of the swinging tailgate. Advantageously, the dynamic floor section shifts toward the open or latch side of the tailgate to allow one to access the objects previously positioned and effectively out of reach adjacent the hinge side of the tailgate including, particularly, those objects toward the front of the storage area away from the tailgate.

SUMMARY

In accordance with the purposes and benefits described herein, a vehicle is provided incorporating a storage area that comprises a dynamic floor section. That dynamic floor section includes a plurality of interconnected panels that slide and fold so as to be displaceable between a home position and a shifted position. In one possible embodiment, the plurality of interconnected panels includes a first panel, a second panel and a third panel. A first hinge connects the first panel with the second panel and a second hinge connects the second panel with the third panel. Further a third hinge connects the third panel to the vehicle.

The storage area further comprises a stationary guide track carried on the vehicle and a guide track follower carried on the first panel. In one possible embodiment, the guide track follower includes rollers. The first panel slides along the guide track while the second panel pivots about the first hinge and the third panel pivots about the second hinge and the third hinge when the dynamic floor section is displaced between the home position and the shifted position.

In one possible embodiment, the vehicle further includes a first side and a second side and the storage area further includes a tailgate extending between the first side and the second side that is opened to gain access to the dynamic floor section. That tailgate is connected to the vehicle by a tailgate hinge at the first side. Further the first, second and third panels extend transversely across the vehicle from the first side to the second side with the first panel oriented toward the first side and the third panel oriented toward the second side. In addition the first, second and third hinges each extend in an axial direction substantially perpendicular to a longitudinal axis of the tailgate.

In one possible embodiment, the stationary guide track includes first and second opposing guide rails. The first and second opposing guide rails each include a guide channel. Further the guide track follower includes a first set of rollers received in the guide channel of the first guide rail and a second set of rollers received in the guide channel of the second guide rail.

In one possible embodiment, the first panel has a width $W_1$, the second panel has a width $W_2$ and the third panel has a width $W_3$ wherein $W_1 > W_2$ or $W_3$. In another possible embodiment, $W_1 > W_2 + W_3$. In another possible embodiment the first and second hinges are living hinges.

In accordance with an additional aspect, an improvement for a vehicle is provided that comprises a dynamic floor section displaceable from a first side of the vehicle toward a second side of the vehicle.

In accordance with yet another aspect, a method is provided for improving access to an area of a dynamic floor section of a vehicle equipped with a side hinge tailgate and including a hinge side and a latch side. That method comprises shifting the dynamic floor section from the hinge side toward the latch side. Further that shifting may include folding and sliding the dynamic floor section toward the latch side of the vehicle.

In the following description, there is shown and described several preferred embodiments of the vehicle and the dynamic floor section. As it should be realized, the vehicle and the dynamic floor section is capable of other, different embodiments and its several details are capable of modification in various, obvious aspects all without departing from the vehicle and dynamic floor section as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and dynamic floor section and together with the description serve to explain certain principles thereof. In the drawing figures.

Reference will now be made in detail to the present preferred embodiment of the vehicle and dynamic floor section, examples of which are illustrated in the accompanying drawings.

DETAILED DESCRIPTION

Figure 1:
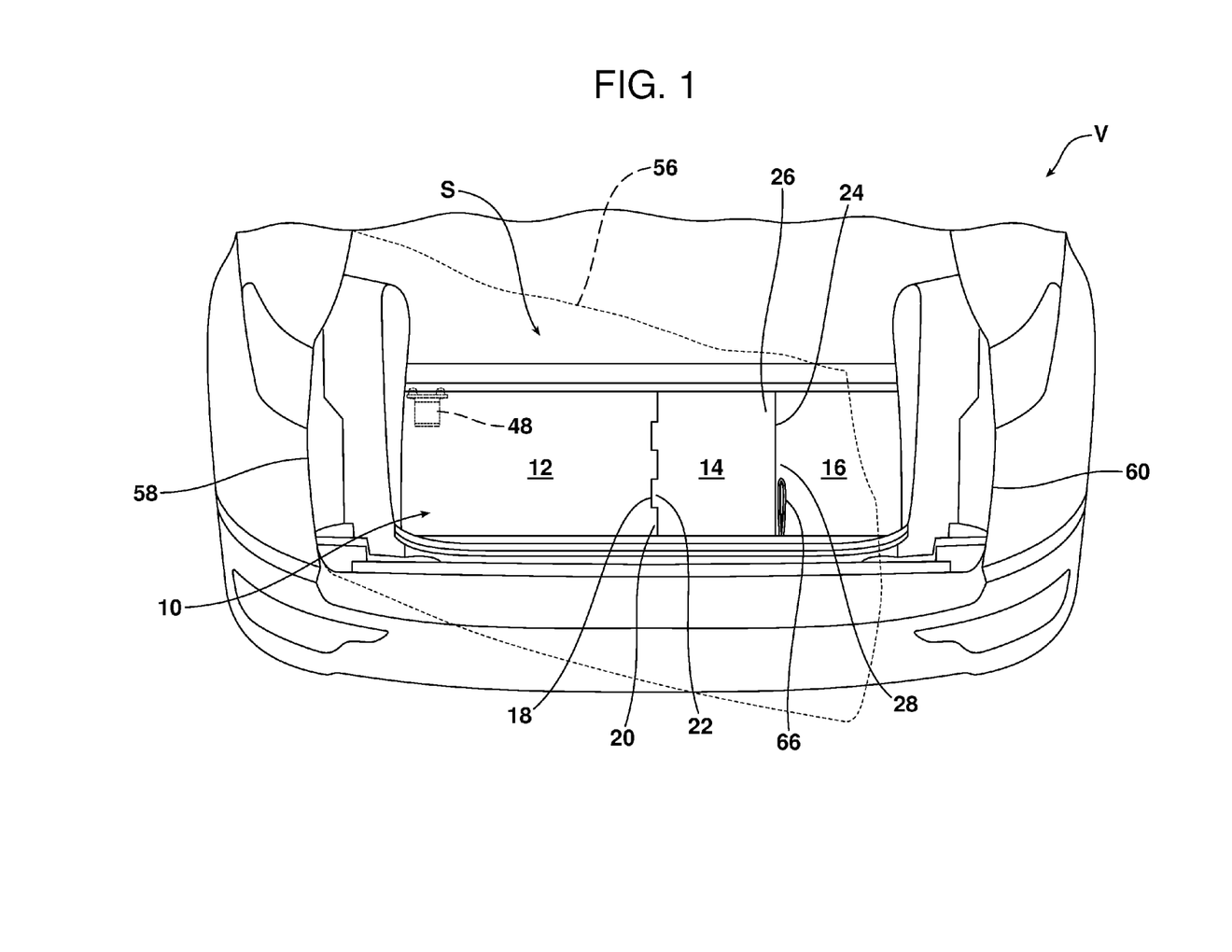
FIG. 1 is a rear view of the vehicle illustrating the cargo or storage area including the dynamic floor section and further illustrating a partially opened side hinged tailgate outlined in phantom so as to allow unlimited access to the latch side of the dynamic floor section within the vehicle. The dynamic floor is shown in the flat or home position.

Reference is now made to FIG. 1 illustrating a vehicle V and, more particularly, the storage area S of that vehicle. As illustrated, the storage area S includes a dynamic floor section 10 which includes a plurality of interconnected panels 12, 14, 16. As will be described in greater detail below, these panels 12, 14, 16 slide and fold so as to be displaceable between the home or flat position illustrated in FIG. 1 to an intermediate position illustrated in FIG. 2 to a fully shifted position illustrated in FIG. 3. A first hinge 18 connects edge 20 of the first panel 12 with the edge 22 of the second panel 14. A second hinge 24 connects the edge 26 of the second panel 14 with the edge 28 of the third panel 16. A third hinge 30 connects the edge 32 of the third panel 16 to the vehicle V (see also FIG. 5). In the illustrated embodiment that connection is made to a stationary floor section 34. The first, second and/or third hinges 18, 24, 30 may be mechanical hinges or living hinges. Living hinges may be made by the same floor carpet that wraps the three panels 12, 14, 16.

Figure 2:
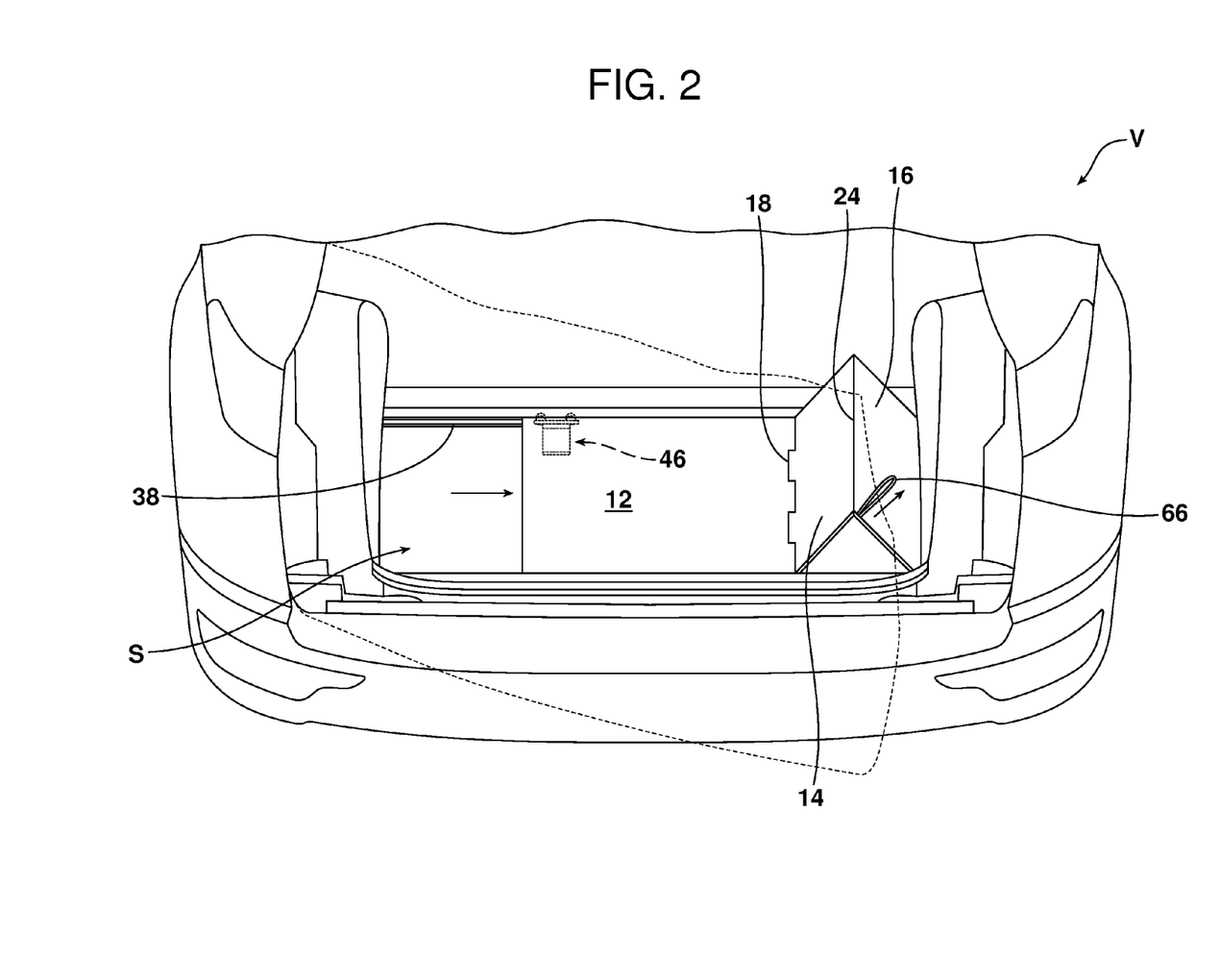
FIG. 2 is a rear view similar to FIG. 1 but illustrating the dynamic floor section partially folded and shifted toward the latch side of the vehicle.
Figure 3:
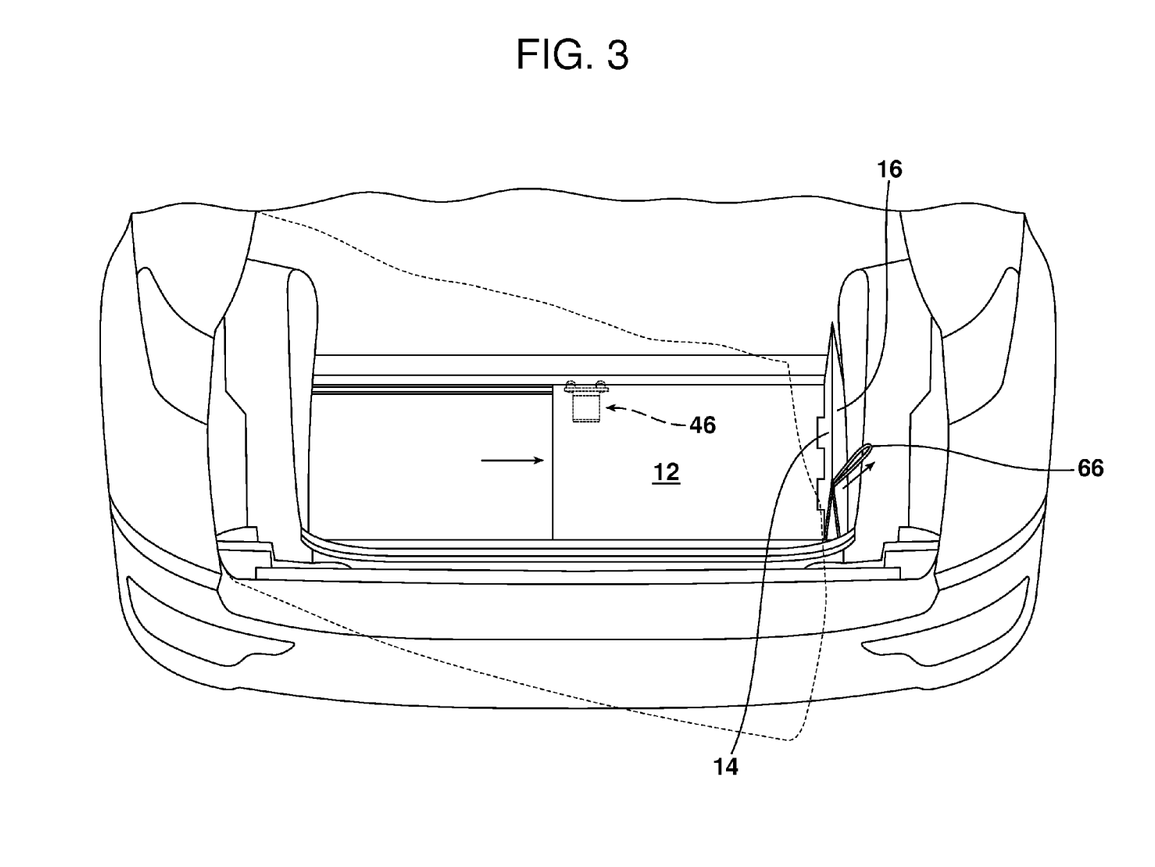
FIG. 3 is a rear view similar to FIGS. 1 and 2 but showing the dynamic floor section fully shifted toward the latch side of the vehicle so as to enable one to access objects carried on the dynamic floor section that were out of reach on the tailgate hinge side of the vehicle when the dynamic floor section was in the home position illustrated in FIG. 1.
Figure 4:
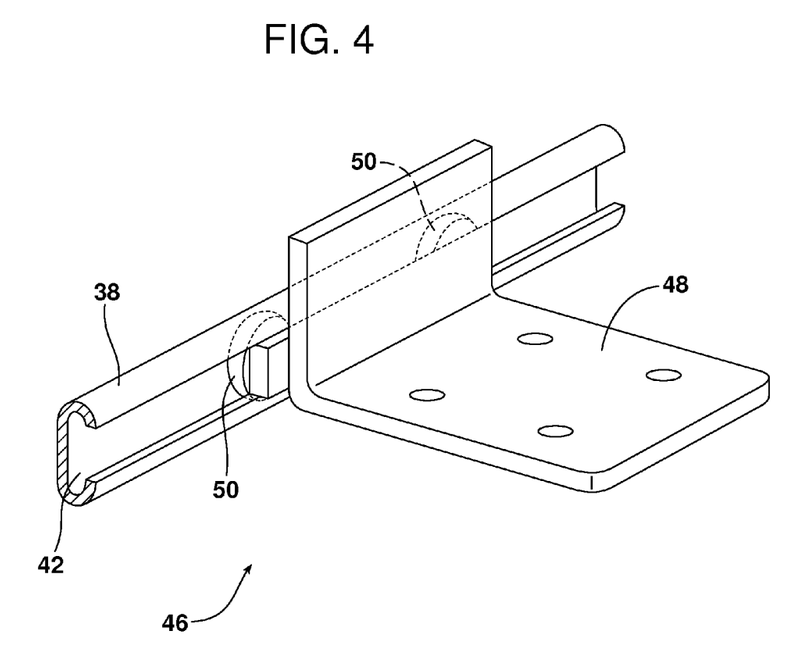
FIG. 4 is a detailed perspective view illustrating a support bracket, a set of guide rollers and one of the guide rails engaged by those rollers.

As further illustrated by FIGS. 1-6, as the first panel 12 is shifted from the home position illustrated in FIG. 1 to the fully shifted position illustrated in FIG. 3, it remains flat and slides along a stationary guide track generally designated by reference numeral 36. That guide track 36 includes first and second opposed guide rails 38, 40. Guide rail 38 includes a guide channel 42 while guide rail 40 includes a guide channel 44. As should be appreciated, the guide rails 38, 40 are mounted to the body of the vehicle V.

Figure 5:
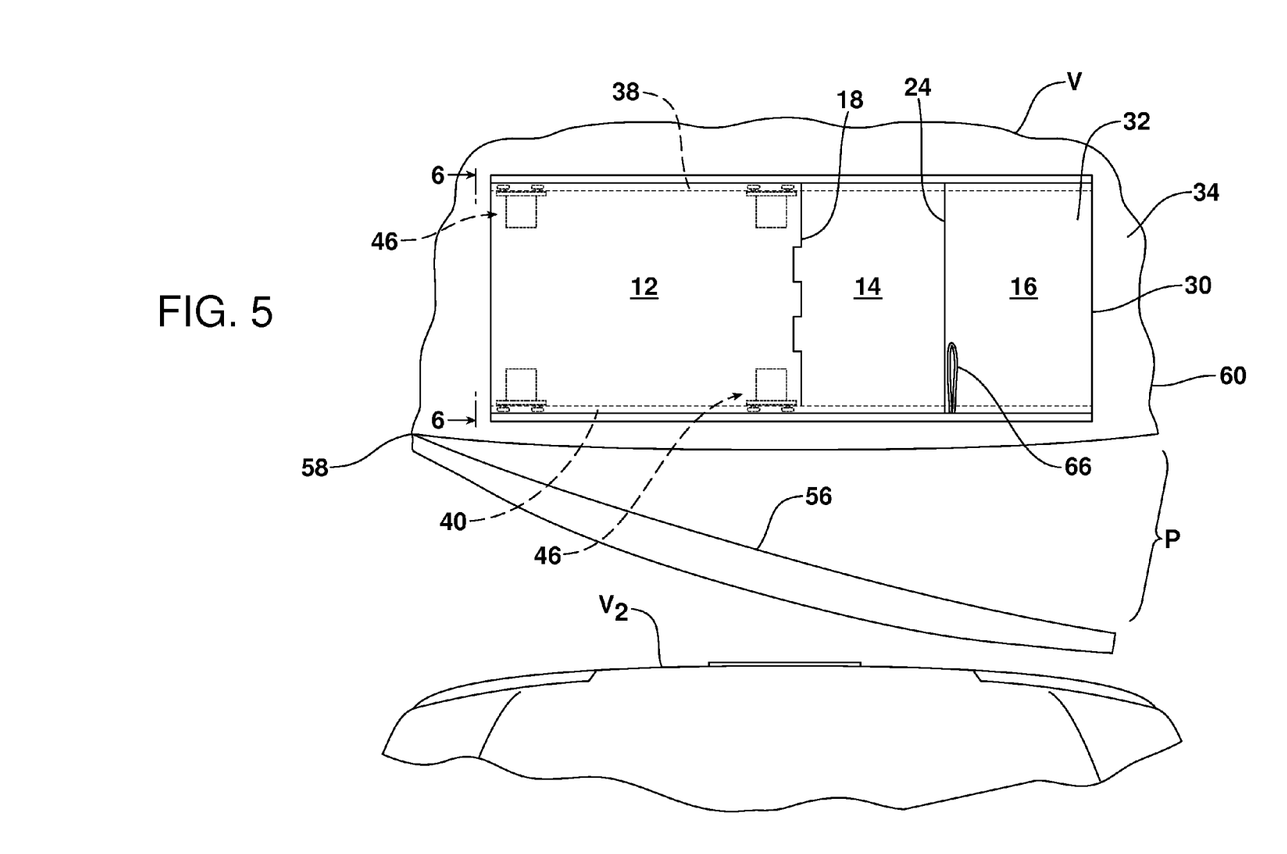
FIG. 5 is a top plan view illustrating the opposed guide rails and the guide track followers connected to the first panel.
Figure 6:
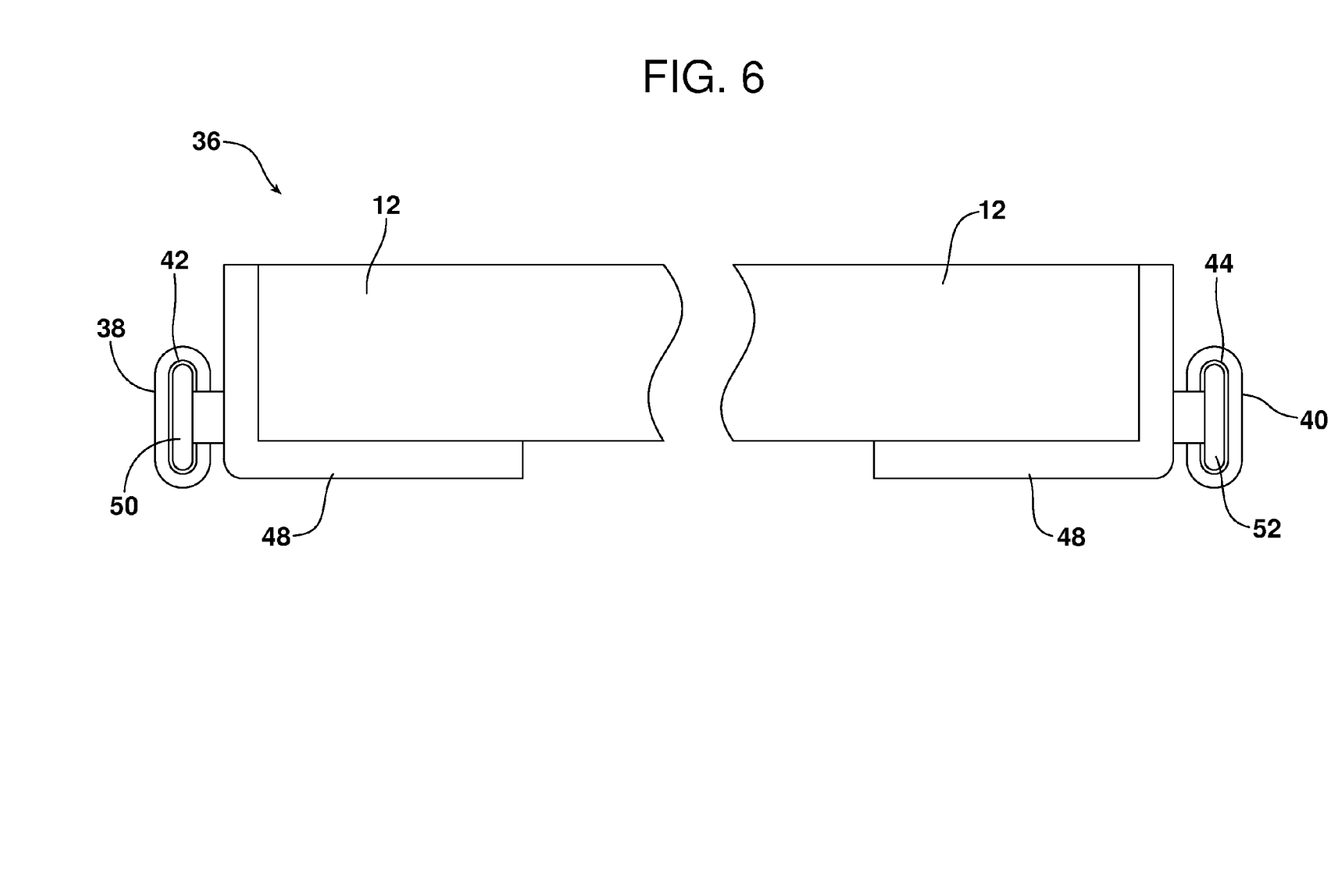
FIG. 6 is an end view illustrating the opposed guide rails of the guide track and the guide track followers connected to the first panel.

A cooperating guide track follower, generally designated by reference numeral 46, is mounted to the underside of the first panel 12. As best illustrated in FIGS. 5 and 6, the guide track follower 46 comprises four brackets 48, one mounted to the underside of the first panel 12 adjacent each corner. The brackets 48 along one edge of the first panel 12 include a first set of rollers 50. The brackets 48 on the opposite edge of the first panel include a second set of rollers 52. The first set rollers 50 are secured in and ride along the guide channel 42 in the guide rail 38 while the second set of rollers 52 are received in and ride along the guide channel 44 in the guide rail 40.

As should be further appreciated, the storage area S of the vehicle V in the illustrated embodiment is equipped with a side hinged door or tailgate 56. That tailgate 56 is connected to the vehicle V by a hinge (not shown) on the tailgate side 58 of the vehicle and swings open on the latch side 60 of the vehicle.

As should be appreciated, a nearby obstruction (a front of a second vehicle $V_2$ in FIG. 5) may limit the angle to which the tailgate 56 may swing open making it very difficult to access any object resting upon the first panel 12 of the dynamic floor section 10.

As should be further appreciated from reviewing the drawing figures, the first, second and third panels 12, 14, 16 extend transversely across the vehicle V from the first or hinge side 58 to the second or latch side 60 with the first panel oriented toward the hinge side and the third panel oriented toward the latch side. Further, the first, second and third hinges 18, 24, 30 for the panels 12, 14, 16 extend in an axial direction substantially parallel to a longitudinal axis of the vehicle V. Thus, the hinges 18, 24, 30 also extend in an axial direction substantially perpendicular to the tailgate 56 when it is in a closed position. As a consequence, when an individual wishes to access any object lying on the first panel 12 he may engage the handle 66 attached to the third panel 16 adjacent the second hinge 24 and pull upwardly toward the latch side 60 of the vehicle V. When this is done the first panel 12 slides along the guide track 36 while maintaining a flat position, the second panel 14 pivots about the hinge 18 and the third panel 16 pivots about the hinges 24 and 30. Thus, the second and third panels 14, 16 rise above the first panel 12 and fold together (see FIG. 2) as the first panel slides across the guide track 36 on the rollers 50, 52 toward the latch side 60 and into the shifted position illustrated in FIG. 3. In this position, the individual may more easily access the object which is now within ready reach through the pie-slice shaped space (shown at P in FIG. 5) provided by the open tailgate 56.

In order to provide for the best possible operation, it should be appreciated that the first panel 12 has a width $W_1$, the second panel 14 has a width $W_2$ and the third panel 16 has a width $W_3$ where the width $W_1 > W_2$ or $W_3$. In one particularly useful embodiment, the width $W_1$ of the first panel 12 is greater than or equal to the width $W_2$ of the second panel plus the width $W_3$ of the third panel 16.

As should be appreciated, the foregoing also describes a method of improving access to an area (i.e. the first panel 12) of a dynamic floor section 10 of a vehicle V equipped with a side hinge tailgate 56. That method may be broadly described as including the step of shifting the dynamic floor section 10 from the hinge side 58 toward the latch side 62 of the vehicle V. As also illustrated in FIGS. 1-3, this shifting of the dynamic floor section 10 includes folding and sliding the dynamic floor section toward the latch side 62 of the vehicle V.

Figure 7:
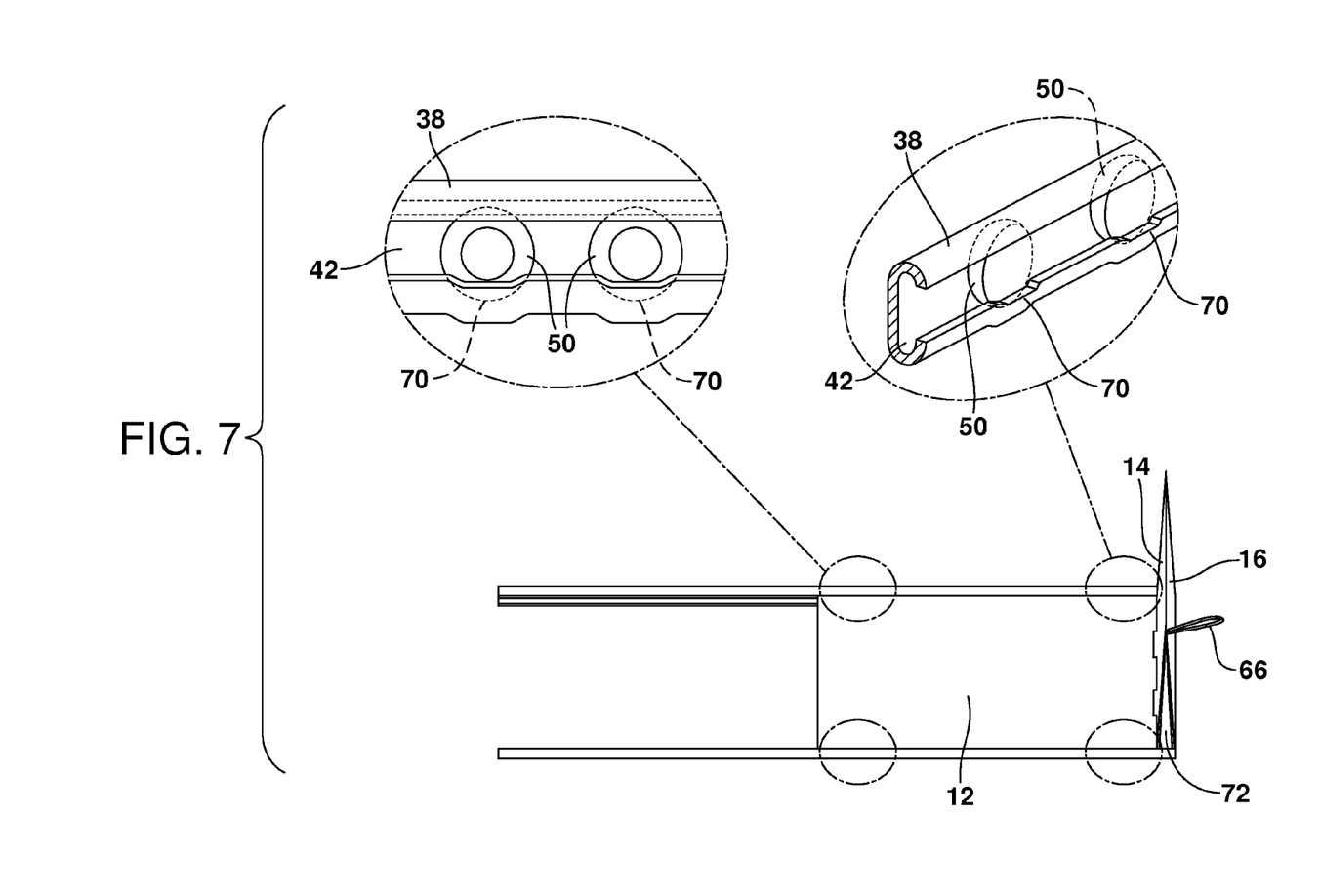
FIG. 7 is perspective and detailed views illustrating valleys provided in the rails to receive the rollers and hold the dynamic floor section in the fully shifted position.

The foregoing has been presented for purposes of illustration and description. It is not intended to be exhaustive or to limit the embodiments to the precise form disclosed. Obvious modifications and variations are possible in light of the above teachings. For example, as illustrated in FIG. 7, each guide rail 38, 40 may include small valleys 70 that receive the rollers 50, 52 and function as detent points to hold the dynamic floor section 10 in the fully shifted position. Here it should be noted that a small angle remains between the two panels 14, 16 in the fully shifted position so as to provide a space 72 into which an operator may insert his fingers. This allows the operator to push the second panel 14 from the latch side 62 toward the hinge side 58 to easily return the dynamic floor section 10 to the home position. All such modifications and variations are within the scope of the appended claims when interpreted in accordance with the breadth to which they are fairly, legally and equitably entitled.

What is claimed is:

1. A vehicle incorporating a storage area, said storage area comprising:
    a dynamic floor section including a first panel, a second panel and a third panel, a first hinge connecting said first panel to said second panel, a second hinge connecting said second panel to said third panel, a third hinge connecting said third panel to the vehicle, a stationary guide track carried on the vehicle and a guide track follower carried on said first panel whereby said first panel, said second panel and said third panel form a plurality of interconnected panels that slide and fold so as to be displaceable between a home position and a shifted position.

2. The vehicle of claim 1, wherein said guide track follower includes rollers.

3. The vehicle of claim 1, wherein said first panel slides along said guide track while said second panel pivots about said first hinge and said third panel pivots about said second and third hinges when said dynamic floor section is displaced between said home position and said shifted position.

4. The vehicle of claim 3, wherein said vehicle includes a first side and a second side and said storage area further includes a tailgate extending between said first side and said second side that is opened to gain access to said dynamic floor section.

5. The vehicle of claim 4, wherein said tailgate is connected to said vehicle by a tailgate hinge at said first side.

6. The vehicle of claim 5, wherein said first, second and third panels extend transversely across said vehicle from said first side to said second side with said first panel oriented toward said first side and said third panel oriented toward said second side.

7. The vehicle of claim 6, wherein said first, second and third hinges each extend in an axial direction substantially parallel to a longitudinal axis of said vehicle.

8. The vehicle of claim 2, wherein said stationary guide track includes first and second opposing guide rails.

9. The vehicle of claim 8, wherein said first and second opposing guide rails each include a guide channel.

10. The vehicle of claim 9, wherein said guide track follower includes a first set of rollers received in said guide channel of said first guide rail and a second set of rollers received in said guide channel of said second guide rail.

11. A vehicle incorporating a storage area, said storage area comprising:
   a dynamic floor section including a plurality of interconnected panels that slide and fold so as to be displaceable between a home position and a shifted position wherein said plurality of interconnected panels include a first panel, a second panel and a third panel wherein said first panel has a width $W_1$, said second panel has a width $W_2$, said third panel has a width $W_3$ and $W_1 > W_2$ or $W_3$.

12. The vehicle of claim 1, wherein said first panel has a width $W_1$, said second panel has a width $W_2$, said third panel has a width $W_3$ and $W_1 > W_2$ or $W_3$.

13. The vehicle of claim 1, wherein said first hinge and said second hinge are living hinges.

14. A method of improving access to an area of a dynamic floor section of a vehicle equipped with a side hinge tailgate and including a hinge side and a latch side, comprising:
   shifting said dynamic floor section from said hinge side toward said latch side whereby the area is moved toward a tailgate opening.

15. The method of claim 14, wherein said shifting includes folding and sliding said dynamic floor section toward said tailgate opening on said latch side of said vehicle.

* * * * *